(12) United States Patent
Zanoni et al.

(10) Patent No.: US 8,548,331 B1
(45) Date of Patent: Oct. 1, 2013

(54) OPTICALLY INTERLEAVED ELECTRONIC ANALOG TO DIGITAL CONVERTERS

(75) Inventors: Raymond Zanoni, Columbia, MD (US); Kim S. Jepsen, Ellicott City, MD (US); Oliver S. King, Frederick, MD (US); Mark A. Laliberte, Crownsville, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 195 days.

(21) Appl. No.: 13/243,208

(22) Filed: Sep. 23, 2011

(51) Int. Cl.
*H04B 10/00* (2013.01)

(52) U.S. Cl.
USPC .......................................... 398/115; 398/202

(58) Field of Classification Search
USPC .................................. 398/215–217, 202–207
See application file for complete search history.

(56) References Cited

U.S. PATENT DOCUMENTS

| | | | | |
|---|---|---|---|---|
| 4,694,276 A * | 9/1987 | Rastegar | | 341/137 |
| 4,928,007 A * | 5/1990 | Furstenau et al. | | 341/137 |
| 4,968,986 A * | 11/1990 | Wagner | | 341/111 |
| 5,010,346 A * | 4/1991 | Hamilton et al. | | 341/137 |
| 5,109,441 A * | 4/1992 | Glaab | | 385/1 |
| 6,118,396 A * | 9/2000 | Song | | 341/137 |
| 6,188,342 B1 * | 2/2001 | Gallo | | 341/137 |
| 6,326,910 B1 * | 12/2001 | Hayduk et al. | | 341/137 |
| 6,404,365 B1 * | 6/2002 | Heflinger | | 341/137 |
| 6,404,366 B1 * | 6/2002 | Clark et al. | | 341/137 |
| 6,420,985 B1 * | 7/2002 | Toughlian et al. | | 341/137 |
| 6,525,682 B2 * | 2/2003 | Yap et al. | | 341/137 |
| 6,529,150 B1 * | 3/2003 | Shoop et al. | | 341/137 |
| 6,661,361 B1 * | 12/2003 | Lewis et al. | | 341/137 |
| 6,700,517 B1 * | 3/2004 | Kellar | | 341/137 |
| 6,771,201 B1 * | 8/2004 | Currie | | 341/155 |
| 7,564,387 B1 * | 7/2009 | Vawter et al. | | 341/137 |
| 7,671,771 B2 * | 3/2010 | Hirono et al. | | 341/137 |
| 7,867,246 B2 | 1/2011 | Kim | | |
| 7,868,799 B1 * | 1/2011 | Price et al. | | 341/137 |
| 7,876,246 B1 * | 1/2011 | Price et al. | | 341/118 |
| 7,956,788 B2 * | 6/2011 | Lee et al. | | 341/155 |
| 7,990,299 B2 * | 8/2011 | Bell | | 341/137 |
| 8,442,402 B1 * | 5/2013 | Zanoni et al. | | 398/115 |
| 8,446,305 B1 * | 5/2013 | Zanoni et al. | | 341/137 |
| 2007/0223936 A1 * | 9/2007 | Babbitt et al. | | 398/182 |
| 2010/0002281 A1 * | 1/2010 | McDonald | | 359/240 |
| 2011/0002029 A1 * | 1/2011 | McDonald | | 359/276 |
| 2012/0213531 A1 * | 8/2012 | Nazarathy et al. | | 398/202 |
| 2013/0077962 A1 * | 3/2013 | Wu et al. | | 398/25 |

\* cited by examiner

*Primary Examiner* — Agustin Bello
(74) *Attorney, Agent, or Firm* — Donna P. Suchy; Daniel M. Barbieri

(57) ABSTRACT

An analog signal receiver includes photonic sampling and electronic quantization. The receiver includes timing control circuitry configured to receive a series of optical pulses and output a plurality of timing signals based on the series of optical pulses to synchronize optical switches that receive a sampled optical signal to time deinterleave the optically sampled signal. The time deinterleaved signals are then sent to a plurality of demodulators wherein each demodulator receives at least one time deinterleaved optically sampled signal and at least one time deinterleaved optical reference signal to produce electrical signals based on the demodulated optical signals.

20 Claims, 6 Drawing Sheets

OPTICALLY INTERLEAVED ELECTRONIC ANALOG TO DIGITAL CONVERTERS

FIELD OF THE INVENTION

The present specification relates to improving the performance of optically interleaved electronic analog-to-digital converters (ADC) implemented in various communications systems including radio-frequency (RF) communication systems.

Military RF system designers have long been aware that wide bandwidth, high resolution ADCs enable capabilities such as wideband staring signal intelligence (SIGINT) receivers, flexible software defined radio system architectures, and Low Probability of Intercept/Low Probability of Detection (LPI/LPD) radars. Fundamental performance limits of conventional ADCs significantly constrains the potential of these and other communication systems. In communication systems that transmit continuous communication signals, such as in RF communication systems, ADC technology is crucial element of system performance. Photonic devices and subsystems provide many advantages over conventional electronic ADC's (eADC) including precision timing and wide input bandwidths. Current ADC's are only capable of digitizing continuous communication signals with bandwidths of up to 10 GHz at less than 10 effective number of bits (ENOB) resolution.

Therefore, there is a need for an optically interleaved electronic ADC system and method to effectively overcome conventional ADC system limitations to provide an ADC capable of achieving 10 ENOB at bandwidths above 10 GHz for military and commercial operations including but not limited to radio, digital RF memory, dynamic signal modulation and wideband cueing receivers.

SUMMARY OF THE INVENTION

Embodiments of a receiver system that implements photonic processing components are disclosed herein. In one embodiment, the system includes a receiver configured to detect an analog signal, a pulsed laser emitting a series of optical pulses at a predetermined sampling rate, and timing control circuitry configured to receive the series of optical pulses and output a plurality of timing signals based on the series of optical pulses. The system also includes an optical splitter to split the series of optical pulses into at least a first optical signal and an optical reference signal, a phase modulator configured to optically sample the received analog signal using the first optical signal to output an RF phase modulated optical signal, also referred to as a sampled optical signal, a plurality of optical signal switches that receive a sampled optical signal and at least one of the plurality of timing signals to time deinterleave the optically sampled signal into a first time deinterleaved optically sampled signal and a second time deinterleaved optically sampled signal, a plurality of optical reference switches that receive the optical reference signal and at least one of the plurality of timing signals to time deinterleave the second optical signal into a first time deinterleaved optical reference signal and a second time deinterleaved optical reference signal and a plurality of demodulators wherein each demodulator receives at least one time deinterleaved optically sampled signal and at least one time deinterleaved optical reference signal.

Embodiments of a method of processing a received analog signal are also disclosed herein. In one embodiment, the method includes detecting an analog signal, producing a series of optical pulses at a predetermined sampling rate with a pulsed laser, producing a plurality of timing signals based on the series of optical pulses, splitting the series of optical pulses into at least a first optical signal and an optical reference signal, and optically sampling the detected analog signal with the first optical signal using a phase modulator to produce a sampled optical signal. The method further includes receiving a sampled optical signal and at least one of the plurality of timing signals at one of a plurality of optical signal switches to time deinterleave the optically sampled signal into a first time deinterleaved optically sampled signal and a second time deinterleaved optically sampled signal, receiving the optical reference signal and at least one of the plurality of timing signals at one of a plurality of optical reference switches to time deinterleave the optical reference signal into a first time deinterleaved optical reference signal and a second time deinterleaved optical reference signal, and receiving at least one time deinterleaved optically sampled signal and at least one time deinterleaved optical reference signal at a one of a plurality of demodulators.

BRIEF DESCRIPTION OF THE DRAWINGS

Exemplary embodiments are hereinafter described, wherein like reference numerals refer to like elements, in which.

DETAILED DESCRIPTION OF THE PREFERRED EMBODIMENTS

Figure 1:
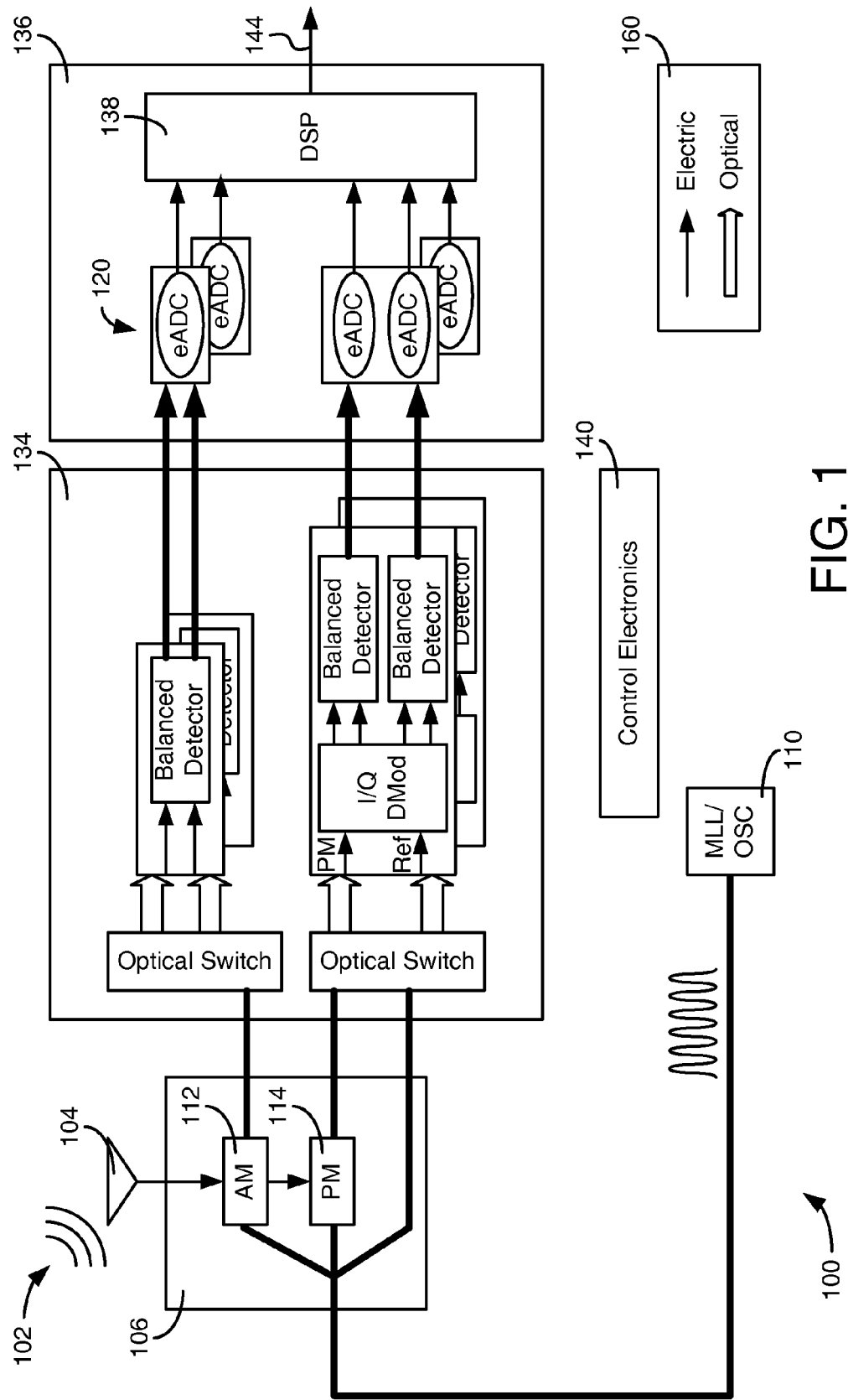
FIG. 1 is a block diagram of an optically interleaved electronic ADC according to an exemplary embodiment.

Before describing in detail the particular improved system and method, it should be observed that the invention includes, but is not limited to, a novel structural combination of optical components and not in the particular detailed configurations thereof. Accordingly, the structure, methods, functions, control and arrangement of components have been illustrated in the drawings by readily understandable block representations and schematic drawings, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

With reference to FIG. 1, a receiver 100 can be used in a several applications including but not limited to military applications, medical imaging applications, radio applications, or any other commercial application (e.g., software defined radio, radio receivers capable of SIGINT operations, radar, digital RF memory, dynamic signal modulation, wideband cueing receivers, and sensor technology). Receiver 100 includes an RF antenna 104. Antenna 104 receives an analog RF signal 102 at frequencies above 10 GHz, for example. In one exemplary embodiment, the photonic processor 134 included in receiver 100 enables receiver 100 to accept and process RF signals in the W-band frequency range, from approximately 75 to 110 GHz. The received analog signal 102 can be input directly into photonic modulation element 106 or may be down converted prior to being transmitted to modulation element 106 to reduce the frequency of received analog signal 102 to an intermediate frequency (IF). According to the embodiment shown in FIG. 1, the directly received or down-converted analog signal 102 will be received by both an amplitude modulation component 112 and a phase modulation component 114.

In general, analog signal 102 is sampled at photonic modulation element 106, optically deserialized at photonic processor 134 by the optical switches and quantized at electrical analog to digital converter (eADC) 120 and processed by a digital signal processor (DSP) 138. The eADC's 120 electronically quantize electrical signals detected by the balanced detectors shown in photonic processor 134 and transmit the quantized electrical signals to digital signal processor 138, which outputs the digital information 144 originally contained in analog signal 102 for further application specific processing. The control electronics 140 used to control the pADC 130 of the W-band receiver 100 provide on-board eADC calibration, timing control, memory, and data processing to ensure effective and proper operation of the W-band receiver 100. The control electronics 140 can be enabled by way of a PC-based applications program, such as a Labview program, which provides system level instrument control, calibration, and real time data analysis. The analysis may also include the ability to calculate a least squares fit to the digitized signal in order to determine ENOB. Also, a Fourier transform calculation may be used to determine the SFDR (as computed by the PC-based applications program).

Photonic processor 134 utilized in the wide band receiver 100 can provide a scalable architecture referred to as multi-dimensional quantization (MDQ). One technical benefit of the MDQ system and method is an ability to increase the ENOB of the photonic ADC over that of the constituent electronic ADCs. MDQ technology also increases the SFDR of the photonic ADC over that of the constituent electronic ADCs and uses optical or hybrid optical/electrical deserialization to reduce the effective sampling rate presented to each electronic ADC. MDQ systems and methods also allow for simple correction for various imperfections of the optical receiver. For example, it allows for increasing the instantaneous bandwidth (IBW) of a wide band receiver to up to 35 GHz while maintaining a resolution of around 8 ENOB. Details of some examples of such photonic processors are described in U.S. Pat. No. 7,876,246, and U.S. Pat. No. 7,868,799, which are incorporated in their entirety herein by reference.

Referring again to FIG. 1, an analog signal 102 received by an antenna 104 is phase and amplitude encoded onto a stream of optical pulses generated by an optical laser such as a low phase noise mode locked laser (MLL) 110, for example. Performing the sampling process using phase modulated optical pulses, as contrasted to simply relaying the RF signal on a phase modulated continuous wave optical carrier to an electronic ADC for sampling, is critical. Optical sampling allows the sampling to occur using an ultra-low jitter optical pulse source 110. Without the low jitter associated with optical sampling, the above benefits cannot be realized, because the performance will be limited by the clock jitter on the clock that drives the electronic ADCs. Alternatively, the amplitude modulator (AM) can be provided with an input directly from a mixer or low noise amplifier (LNA) instead of from the antenna 104. The resultant optical pulses are demodulated on three separate channels including In-phase (I) and Quadrature (Q) data resulting from optical hybrid I/Q demodulation 226 of signals from the optical phase modulator 114 and the un-modulated channel in optical modulation element 106, and amplitude data transmitted from optical amplitude modulator 112. One purpose of photonic processor 134 is to deserialize the sampled analog signal 102 with optical switches such that each of the three separate channels may be provided in parallel prior to being converted to electrical signals to effectively overcome the limitations of the relatively low speed photodiodes and electrical quantizers. Accordingly, the collective sampling rate of electrical quantization element 136 can be greatly increased depending on the number of parallel paths and the particular configuration of elements 134 and 136.

Figure 2:
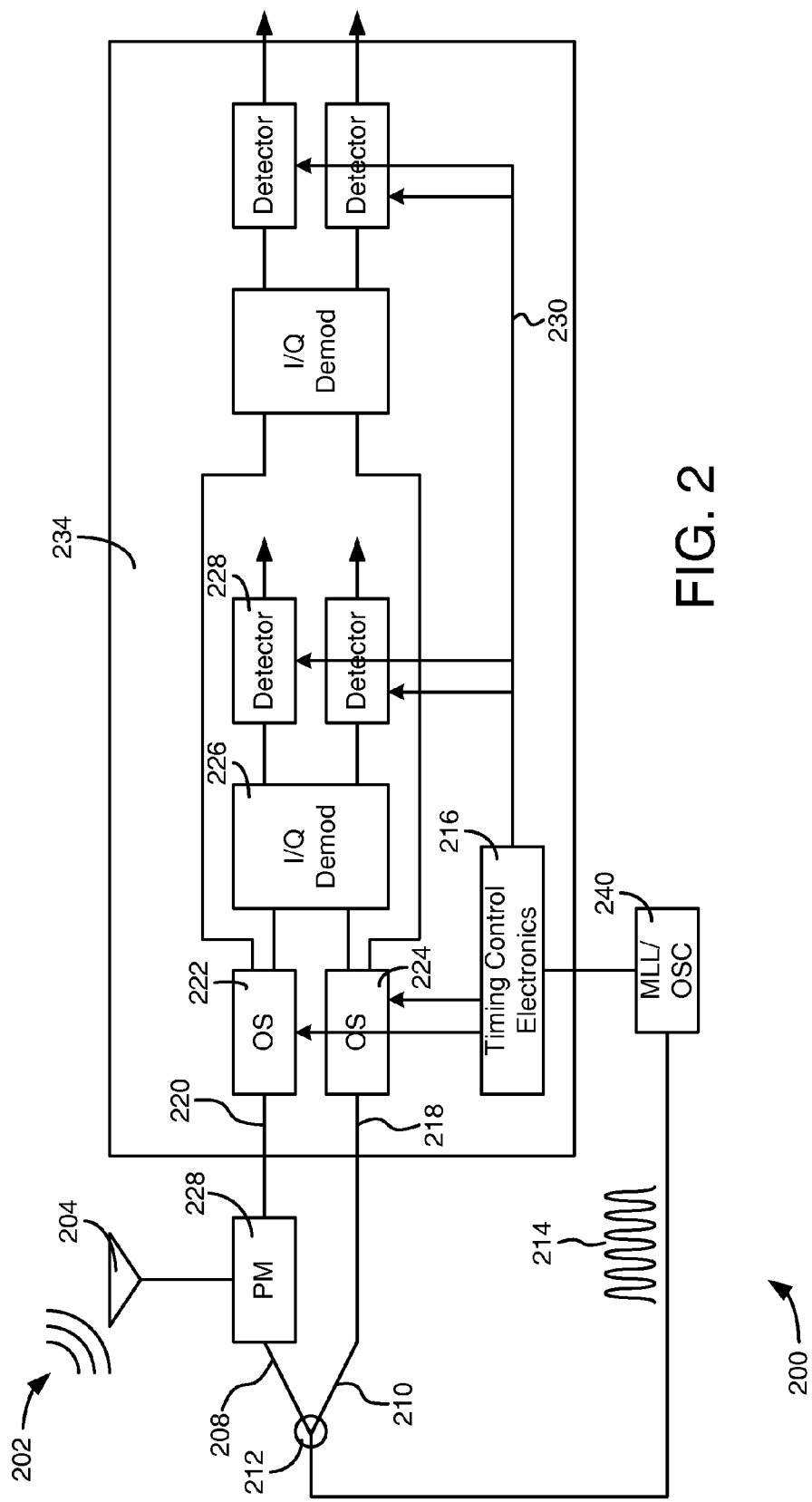
FIG. 2 is a block diagram of a photonic processor according to one exemplary embodiment.
Figure 3:
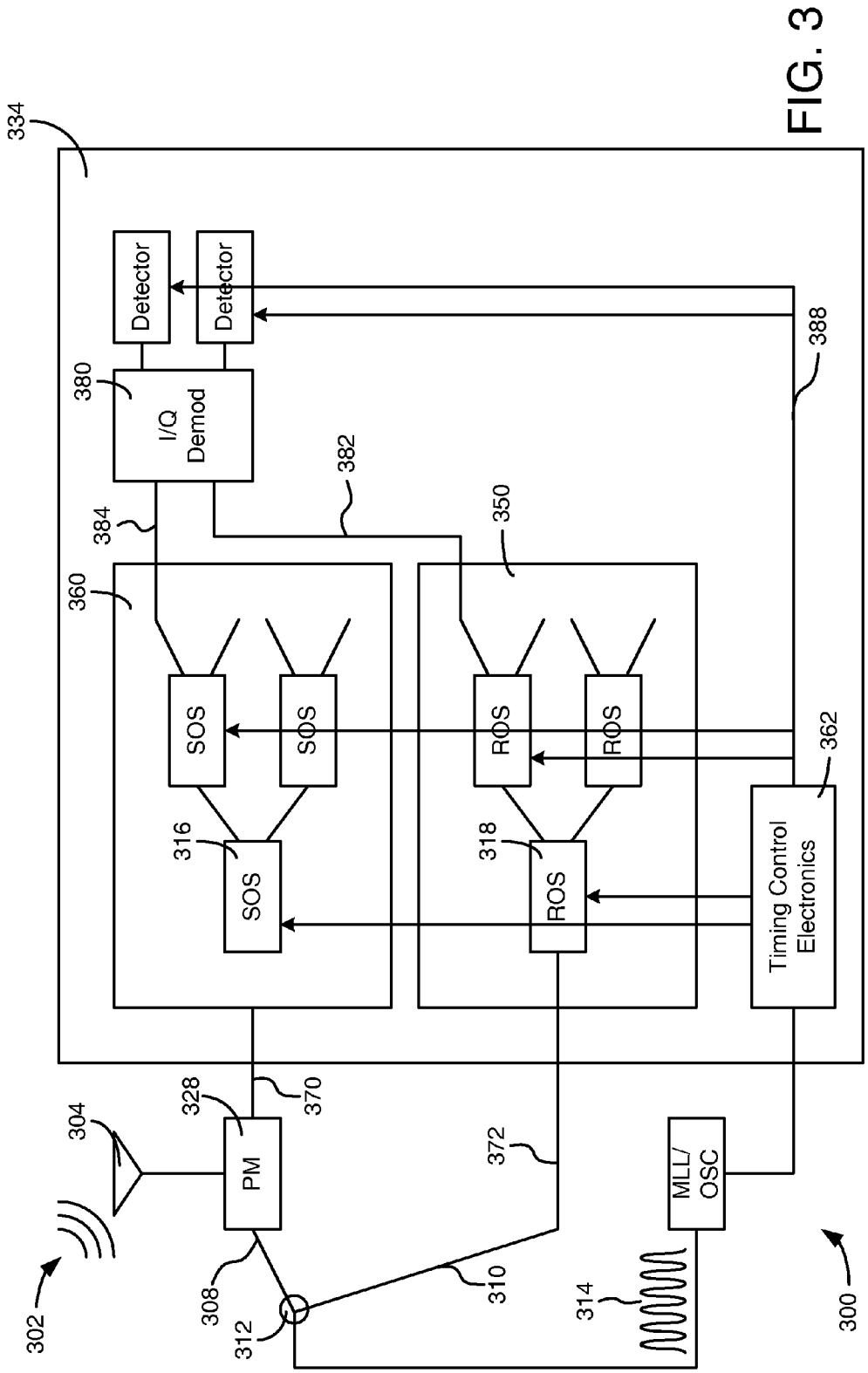
FIG. 3 is a block diagram of a photonic processor in greater detail according to another exemplary embodiment.

In the embodiment shown in FIG. 1, the optical switches provided on the I, Q, and amplitude channels time deinterleave each channel to by providing serial to parallel conversion in each optical channel according to timing signals derived from the optical pulse train from MLL 110. FIG. 2 and FIG. 3 depict two exemplary embodiments of a system and method of deserialization using optical switches to overcome the relatively low speed electrical processing of eADC's 120 discussed in further detail below. Referring again to FIG. 1, at modulation element 106, an optical signal from laser 110 is provided to amplitude modulator 112 to create a separate amplitude channel which is used by electrical quantizer 136 to remove any $2\pi$ phase ambiguity introduced into the phase modulated signal in cases where the phase modulator 114 is driven through more than one $2\pi$ phase rotation. Accordingly, the amplitude channel is used to provide additional information to ensure an accurate phase demodulation. Although the amplitude channel is not shown in the exemplary deserialization embodiments depicted in FIG. 2 and FIG. 3 for simplicity, the amplitude channel will be structured in the same manner as the phase modulation deserialization embodiments in those figures according to one embodiment. Once the amplitude, in-phase and quadrature channels have been deserialized at photonic processor 134, each of the deserialized channels are then electrically quantized by respective eADC's 120 to produce a digital electrical signal 144.

In many cases, the performance of the photonic processor 134 is determined by the low phase noise of the pulsed laser 110 while the aperture window is defined by the optical pulse width that samples the RF waveform 102 at the phase modulator 114. With respect to phase noise, a MLL 110 provides better performance than by using a continuous wave (CW) laser as it produces an optical pulse train with lower jitter and higher resolution rate optical pulses. A photonic sampling element 106, encodes the analog signal 102 onto the phase and amplitude of the optical pulse stream. A photonic processor 134 contains components for optical deserialization, I/Q demodulation, and optical to electrical detection. An electronic quantization stage 136, also referred to herein as a digitizer, includes multiple eADC's 220 per optical channel, with associated calibration, memory and processing functionality according to one exemplary embodiment. The number of eADC's per electrical channel, such as two, four, five, or more, may be utilized in the digital platform while remaining within the spirit and scope of the invention. According to one embodiment the number of eADC's is dependent on the number of time deinterleaved channels that are implemented at the optical switches shown in photonic processor 134. In addition, control electronics 140 are functionally connected to photonic processor 134 and electronic quantizer 136 to incorporate the various processes disclosed herein and to provide overall system management. Control electronics 140 may comprise at least one processor and at least one memory so that the control electronics processor can carry out instructions stored in the memory.

Referring to FIG. 2 and FIG. 3, a more detailed view of photonic processor 134 is shown. The receiver 200 shown in FIG. 2 corresponds to the timing diagram shown in FIG. 6, while the receiver 300 shown in FIG. 3 corresponds to the timing diagram shown in FIG. 5. Both FIG. 2 and FIG. 3 depict alternate embodiments for time de-interleaving the optically phase modulated signal received from phase modulator 114 and the un-modulated optical reference signal received from modulation element 106. Both FIG. 2 and FIG. 3 distribute optical pulses transmitted from laser 110 into separate optical paths according to a particular combination of optical switching and optical timing mechanisms.

Figure 5:
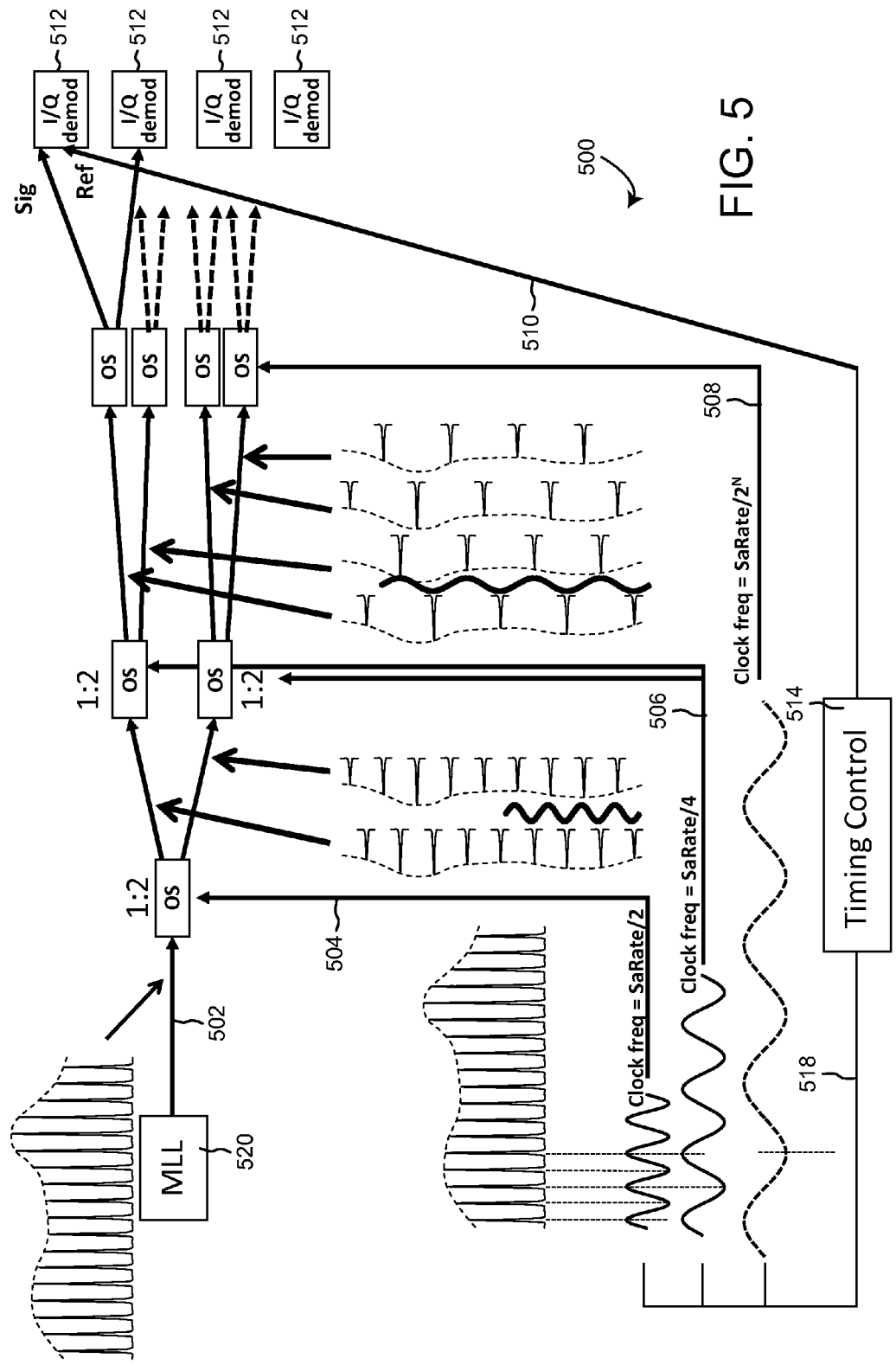
FIG. 5 is a block diagram depicting a timing control process used in a photonic processor according to one embodiment.
Figure 6:
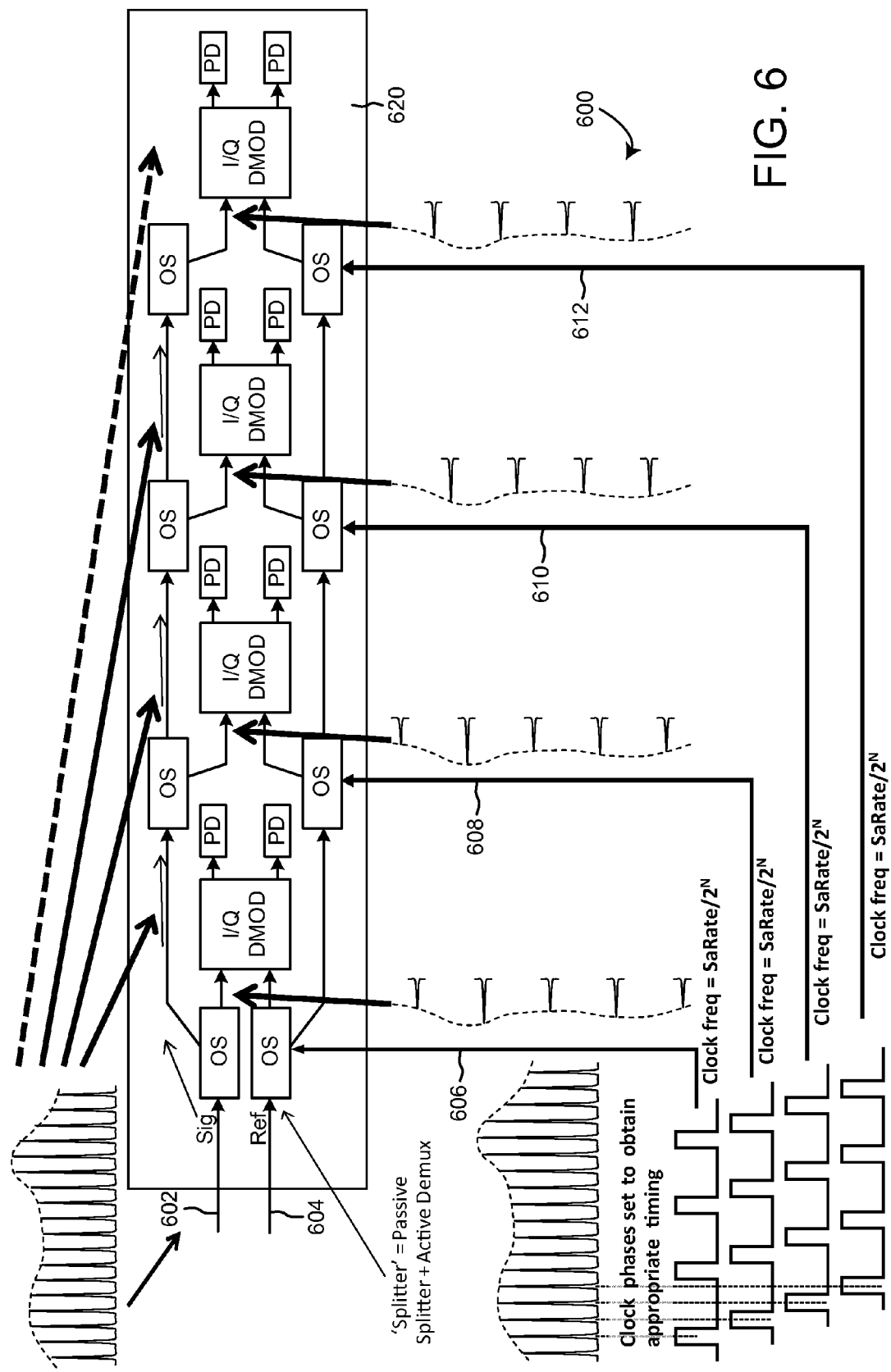
FIG. 6 is a block diagram depicting a timing control process used in a photonic processor according to another embodiment.

In both FIGS. 2-3 and 5-6, time de-interleaving the high sample rate (such as 20 Gs/s) optical pulse trains in the I and Q optical channels shown in FIG. 1 reduces the operating frequency required of each photodetector and eADC 120 shown in FIG. 1. For example, conventional eADC's are not capable of operating at a frequency high enough to detect each optical pulse in the optical pulse train transmitted from laser 110. Time de-interleaving effectively reduces the required operating of frequency eADC's 120 by dividing the optical pulse train from laser 110 into a predetermined number of temporal windows as shown in FIG. 5 and FIG. 6. According to one embodiment, the number of predetermined windows is represented by the number N. In some exemplary embodiments, the number of temporal windows is predetermined and is equal to the number of I/Q demodulators such that different only every Nth pulse is sent to an Nth I/Q demodulator.

For example, with respect to FIG. 2, MLL 240 emits an optically pulsed signal with a sample rate of 20 Gs/s according to one exemplary embodiment. In the nested de-interleaving structure of FIG. 2, the number of I/Q demodulators is two, but three, four, five, ten, forty or any other number of I/Q demodulators may be implemented. The structure of FIG. 2 also includes optical switches 222 and 224 wherein optical switch 222 time de-interleaves optical phase modulated signal 220 while optical switch 224 time de-interleaves optical reference signal 218. According to one embodiment, because there are two I/Q demodulators 226, alternate pulses in optical pulse train 214 are split between the first and second I/Q demodulators. Accordingly, electrical components receiving signals from I/Q demodulators 226, such as photodetectors 228, are only required to sample the time de-interleaved signals at a rate of 10 Gs/s, reducing the electrical detection rate by a factor of N. In this way, the nested time de-interleaving structure can be structured depending on the capabilities of electrical components and the desired analog signal bandwidth.

Referring to FIG. 2, optical pulse train 214 emitted from MLL 210 at a predetermined rate such as 20 Gs/s is provided to an optical splitter 212 and to timing control electronics 216. At splitter 212 the energy of optical pulse train 214 is split between the two output ports, one optical signal 208 optically samples analog signal 212 at phase modulator 228 at a rate of 20 Gs/s while one optical signal 210 remains un-modulated as a reference signal. According to other embodiments, splitter 212 divides optical pulse stream 214 into three separate channels, with a third channel being sent to an amplitude modulator as in FIG. 1. According to one embodiment, the amount of power sent to the amplitude modulator 112 is much lower than the amount of power sent to phase modulator 228 or the reference channel. For example, in one embodiment, approximately 1% of the power is provided the amplitude modulator to be used to track the number of $2\pi$ phase changes encoded on the signal by a phase modulator. The balance of the power (the other 99%) is split into two paths, one which is phase modulated by a phase modulator 228 and the other that is used as a reference signal by the photonic processor 234 for I/Q demodulation.

Referring again to FIG. 2, the RF signal 202 received by the RF antenna 204 modulates the optical pulse stream 208 by the phase modulator 228. After phase modulation by the RF or other analog signal 202, the optical phase modulated signal 220 is sent to optical switch 222, while optical reference signal 218 is sent to optical switch 224. Optical switches for phase modulated signals 222 and for reference signals 224 are both controlled by a common timing signal derived from MLL 240. Each optical switch 222 and 224 can be a lithium niobate switch, such as one made by E-O Space Inc., according to one exemplary embodiment. Coherent optical deinterleaving of the kind depicted in FIG. 2 and FIG. 6 require accurate synchronization between the optical pulse train 214 and the optical switches 222 and 224 as well as detectors 228. In one embodiment, detectors 228 are gated by the timing signal 230 to improve the extinction ratio, or ratio of power levels between an on and off state. In FIG. 2, because there are two I/Q demodulators, and N is equal to two, timing control electronics 216 will direct optical switches 222 to alternate sending consecutive pulses between a first and second I/Q demodulator 226 such that each demodulator only sees every other optical pulse. Accordingly, each I/Q demodulator will encounter a 10 Gs/s phase modulated optical pulse and a 10 Gs/s optical reference pulse. In this way, increasing the number of N demodulators has the effect of increasing the "off" time of each of the optical switches 228.

FIG. 6 is another example of the nested time deinterleaving architecture with a more detailed view of the timing control signals. In the embodiment depicted in FIG. 6, there are four I/Q demodulators that accordingly only receive every fourth optical pulse in the respective optical pulse trains 602 and 604. As in FIG. 2, the optical switches are controlled by timing signals 606, 608, 610 and 612 from timing control circuitry, not shown in FIG. 2. As discussed previously, the optical switches are timed according to a clock frequency that is dependent upon the number N of optical demodulators. According to one embodiment, the clock frequency is the sampling rate of MLL 240 divided by the number of optical demodulators. Providing this clock frequency to the time deinterleaving structure 600 using signals 606, 608, 610 and 612 ensures the photonic sampler 234 is synchronously clocked to the 20 Gs/s optical pulse stream.

As shown in FIG. 6, each optical switch labeled "OS" is time demultiplexing or time deinterleaving the received optical signal. Each of the set of two optical switches associated with a particular I/Q demodulator receives one of four consecutive optical pulses as shown in the timing chart below nested deinterleaving structure 620. Here, for example, if optical pulse trains 602 and 604 have a sampling rate of 20 Gs/s, each I/Q demodulator will encounter an optical pulse train of 5 Gs/s. Furthermore, as indicated in FIG. 6, each of the optical timing signals 606, 608, 610, and 612, the clock frequencies sent to each optical switch are all equal. In addition, each of these optical timing signals are preferably sent to each of the balanced photodetectors 228 to improve the extinction and to each of the eADC's 120 to synchronize the received data with sampling rate of MLL 110 and to achieve a requisite extinction ratio to accurately convey a digitized version of the original analog signal 102 to processor 138 according to one exemplary embodiment.

Figure 4A:
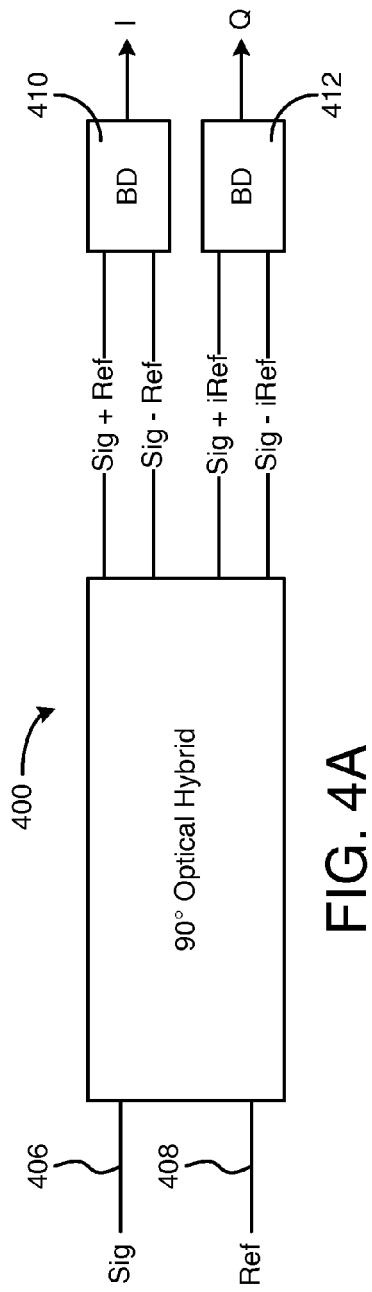
FIG. 4A is a block diagram of a demodulator used in the photonic processor according to one exemplary embodiment.
Figure 4B:
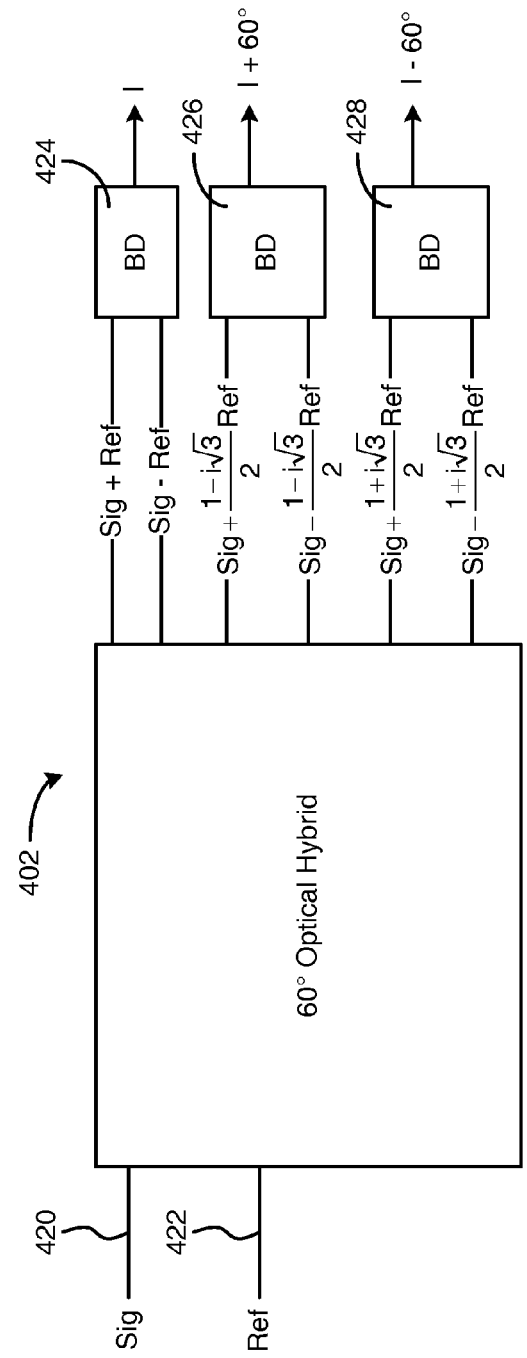
FIG. 4B is a block diagram of a demodulator used in the photonic processor according to another exemplary embodiment.

In both FIG. 2 and FIG. 6, I/Q demodulators, shown in greater detail in FIGS. 4A and 4B, will receive de-interleaved phase modulated and reference optical signals with a reduced sampling rate. Each of the I/Q demodulators 226 may be a 90° optical hybrid demodulator shown as element 400 in FIG. 4A with two photodetectors 410 and 412 to convert the received optical signals into electrical I and Q signals. I/Q demodulators 400 may be demodulators such as ones made by Optoplex, Inc. However, the I/Q demodulators are not limited to 90° optical hybrid demodulators and may include 60° demodulators or any other variation of an I/Q demodulator. Each balanced photodetector 410, 412, 424, 426, and 428 can be a InP, 20 GHz bandwidth balanced photodetector, such as one made by $U^2T$ Inc. Other commercially available switches, I/Q demodulators, and balanced photodetectors may be used in the receiver 100 as shown in FIG. 1, while remaining within the spirit and scope of the invention. By using such devices in a preferred implementation of the first embodiment, receiver 100 is well suited for heterogeneous Si/InP chip scale integration, which is highly desirable for military and other applications that require durable and long-lasting components.

Once the optical I and Q channel signals have been converted to analog electrical signals by the balanced photodetectors, the electrical signals are quantized by eADC's 120 as shown in FIG. 1 at a rate determined by the clock frequency provided by timing control electronics 216. Furthermore, according to one exemplary embodiment, the number of eADC's is equal to 2 multiplied by N, wherein N indicates the number of I/Q optical demodulators. Finally at DSP 138, the quantized electrical signals are time multiplexed or time interleaved to reconstitute the original received analog signal 102. In addition, post processing such as impairment compensation and digital carrier phase recovery may be performed according to some exemplary embodiments.

In addition to following the general process of optical sampling, optical time deinterleaving, balanced detection and electrical quantization described above in the nested time denterleaving structure depicted in FIGS. 2 and 6, several other time deinterleaving structures may be implemented. For example, FIGS. 3 and 5 depict time deinterleaving tree architecture 300, whereby signal optical switches 316 for 1 channel data and reference optical switches for Q channel data are arranged in a tree configuration. In the embodiments shown in FIGS. 3 and 5, the plurality of signal optical switches 316 and the plurality of reference optical switches 318 are arranged in a plurality of N levels so that each level comprises an equal number of signal optical switches and reference optical switches wherein two raised to the Nth power is equal to the number of optical I/Q demodulators and each level includes two raised to the Nth power combined signal and reference optical switches according to one exemplary embodiment.

Furthermore, unlike the nested time deinterleaving structure, each optical switch contained in each of the N levels operates at a different optical clock frequency. Accordingly, in FIG. 3 and FIG. 5, the 2 raised to the power N combined optical switches associated with an Nth level receives a timing signal having a clock frequency equal to the predetermined sampling rate, such as 20 Gs/s, divided by 2 raised to the power of N. Additionally, as in the embodiments shown in FIGS. 2 and 6, the embodiments shown in FIGS. 3 and 5 can be split into three optical channels including an amplitude modulation channel as shown in FIG. 1.

It is understood that while the detailed drawings, specific examples, material types, thicknesses, dimensions, and particular values given provide a preferred exemplary embodiment of the present invention, the preferred exemplary embodiment is for the purpose of illustration only. The method and apparatus of the invention is not limited to the precise details and conditions disclosed. For example, although specific types of optical component, dimensions and angles are mentioned, other components, dimensions and angles can be utilized. Also, receiver 100 may be implemented in a wide band RF stage system or any other type of high-frequency band receiver, such as receivers operating in the 70 GHz to 200 GHz and up range. Various changes may be made to the details disclosed without departing from the spirit of the invention which is defined by the following claims.

What is claimed is:

1. A receiver including a photonic processing component comprising:
    a receiver configured to detect an analog signal;
    a pulsed laser emitting a series of optical pulses at a predetermined sampling rate;
    timing control circuitry configured to receive the series of optical pulses and output a plurality of timing signals based on the series of optical pulses;
    an optical splitter to split the series of optical pulses into at least a first optical signal and an optical reference signal;
    a phase modulator configured to optically sample the received analog signal using the first optical signal to output a sampled optical signal;
    a plurality of optical signal switches that receive a sampled optical signal and at least one of the plurality of timing signals to time deinterleave the optically sampled signal into a first time deinterleaved optically sampled signal and a second time deinterleaved optically sampled signal;
    a plurality of optical reference switches that receive the optical reference signal and at least one of the plurality of timing signals to time deinterleave the second optical signal into a first time deinterleaved optical reference signal and a second time deinterleaved optical reference signal; and
    a plurality of signal processors wherein each signal processor receives at least one time deinterleaved optically sampled signal and at least one time deinterleaved optical reference signal.

2. The apparatus of claim 1, wherein the number of reference optical switches is equal to the number of signal optical switches.

3. The apparatus of claim 1, wherein the plurality of signal processors are optical demodulators.

4. The method of claim 1, wherein the demodulator is a 90 degree optical hybrid demodulator.

5. The apparatus of claim 2, wherein the optical demodulators produce an output that is received by a pair of photodetectors wherein the output of each photodetector is an electrical signal that is received by an electrical quantizer.

6. The apparatus of claim 5, wherein each of the photodetectors receive one of the plurality of timing signals.

7. The apparatus of claim 1, wherein the analog signal is a radio frequency (RF) signal.

8. The apparatus of claim 1, wherein the timing signal is an optical timing signal.

9. The apparatus of claim 1, wherein the an optical splitter further splits the series of optical pulses into a third optical path supplied to an amplitude modulator configured to amplitude-modulate the received analog signal with the stream of optical pulses.

10. The apparatus of claim 1, wherein the plurality of signal optical switches and the plurality of reference optical switches are arranged in a plurality of n levels so that each level comprises an equal number of signal optical switches and reference optical switches wherein n is a positive non-zero integer and each level is associated with $2^n$ optical switches.

11. The apparatus of claim 6, wherein the $2^n$ optical switches associated with an nth level receive a timing signal having a clock frequency equal to the predetermined sampling rate divided by $2^n$.

12. The apparatus of claim 1, wherein the plurality of timing signals have the same clock frequency.

13. The apparatus of claim 10, wherein the clock frequency is the predetermined sampling rate divided by 2 raised to a power equal to the number demodulators used to receive at least one time deinterleaved optically sampled signal and at least one time deinterleaved optical reference signal.

14. A method of processing a received analog signal comprising:
    detecting an analog signal;
    producing a series of optical pulses at a predetermined sampling rate with a pulsed laser;
    producing a plurality of timing signals based on the series of optical pulses
    splitting the series of optical pulses into at least a first optical signal and an optical reference signal;
    optically sampling the detected analog signal with the first optical signal using a phase modulator to produce a sampled optical signal;
    receiving a sampled optical signal and at least one of the plurality of timing signals at one of a plurality of optical signal switches to time deinterleave the optically sampled signal into a first time deinterleaved optically sampled signal and a second time deinterleaved optically sampled signal;
    receiving the optical reference signal and at least one of the plurality of timing signals at one of a plurality of optical reference switches to time deinterleave the optical reference signal into a first time deinterleaved optical reference signal and a second time deinterleaved optical reference signal; and
    receiving at least one time deinterleaved optically sampled signal and at least one time deinterleaved optical reference signal at a one of a plurality of signal processors.

15. The method of claim 14, wherein the number of reference optical switches is equal to the number of signal optical switches.

16. The method of claim 14, wherein the plurality of signal processors are optical hybrid demodulators that produce an output that is received by a pair of photodetectors wherein the output of each photodetector is an electrical signal that is received by an electrical quantizer.

17. The apparatus of claim 1, wherein the an optical splitter further splits the series of optical pulses into a third optical path supplied to an amplitude modulator configured to amplitude-modulate the received analog signal with the stream of optical pulses.

18. The method of claim 14, wherein the plurality of signal optical switches and the plurality of reference optical switches are arranged in a plurality of n levels so that each level comprises an equal number of signal optical switches and reference optical switches wherein n is a positive non-zero integer and each level is associated with $2^n$ total optical switches.

19. The apparatus of claim 6, wherein the $2^n$ optical switches associated with an nth level receive a timing signal having a clock frequency equal to the predetermined sampling rate divided by $2^n$.

20. The method of claim 14, wherein the plurality of timing signals have the same clock frequency and the clock frequency is the predetermined sampling rate divided by 2 raised to a power equal to the number of demodulators used to receive at least one time deinterleaved optically sampled signal and at least one time deinterleaved optical reference signal.

* * * * *

UNITED STATES PATENT AND TRADEMARK OFFICE
CERTIFICATE OF CORRECTION

PATENT NO. : 8,548,331 B1
APPLICATION NO. : 13/243208
DATED : October 1, 2013
INVENTOR(S) : Raymond Zanoni et al.

Page 1 of 1

It is certified that error appears in the above-identified patent and that said Letters Patent is hereby corrected as shown below:

In the Claims

Claim 1, column 8:
    line 15, after "A receiver" insert --apparatus--.
    line 28, replace the second "a" with --the--.
    line 30, replace "optically sampled" with --sampled optical--.
    line 36, replace "second optical" with --optical reference--.

Claim 2, column 8:
    lines 44-45, replace "reference optical" with --the optical reference--.
    line 45, replace "signal optical" with --the optical signal--.

Claim 4, column 8:
    line 49, replace "The method of claim 1" with --The apparatus of claim 3--.

Claim 5, column 8:
    line 51, replace "claim 2" with --claim 3--.

Claim 9, column 8:
    line 64, delete "received".
    line 64, replace "stream" with --series--.

Signed and Sealed this
Twentieth Day of May, 2014

Michelle K. Lee
*Deputy Director of the United States Patent and Trademark Office*